United States Patent [19]

Myhre

[11] 3,769,110

[45] Oct. 30, 1973

[54] DIAPHRAGM FOR LOW-PRESSURE TRANSDUCERS

[75] Inventor: Kjell E. Myhre, Sierra Madre, Calif.

[73] Assignee: Micron Instruments, Inc., Los Angeles, Calif.

[22] Filed: May 14, 1971

[21] Appl. No.: 143,421

[52] U.S. Cl. .......................... 156/6, 72/342, 72/354, 156/18, 338/2

[51] Int. Cl. .......................... B23p 15/00, C23f 1/00

[58] Field of Search .......................... 156/6, 18, 528; 72/336, 337, 342, 354; 83/30, 55; 264/153, 268; 29/432.1, 432.2; 338/72.2

[56] References Cited

UNITED STATES PATENTS

| | | | |
|---|---|---|---|
| 2,955,027 | 10/1960 | Newell et al. | 156/18 |
| 1,157,288 | 10/1915 | Blau | 156/6 |
| 2,554,256 | 5/1951 | Lewis et al. | 156/6 |
| 3,563,819 | 2/1971 | Rheingold et al. | 156/6 |

*Primary Examiner*—William A. Powell
*Attorney*—Luc P. Benoit

[57] ABSTRACT

A method of making a substantially stress-free metal diaphragm for a diaphragm-type low-pressure transducer provides a disk of metal for the diaphragm, which disk has a first diameter, and provides a cylindrical first member for forming the diaphragm from this disk. This cylindrical member has a second diameter being smaller than the mentioned first diameter. A second member is provided for pressing the disk against the mentioned first member. The first member is placed relative to the disk so that a peripheral portion of the disk laterally exceeds the first member. The peripheral disk portion is forced about the cylindrical first member and the disk is pressed against the first member with the second member while the peripheral disk portion is being formed about the cylindrical first member.

The disclosure also covers a substantially stress-free metal diaphragm for a diaphragm-type low-pressure transducer made by said method.

4 Claims, 11 Drawing Figures

INVENTOR.
KJELL E. MYHRE
BY [signature]
ATTORNEY.

DIAPHRAGM FOR LOW-PRESSURE TRANSDUCERS

BACKGROUND OF THE INVENTION

1. Field of the Invention

The subject invention relates to diaphragm-type low-pressure transducers and, more particularly, to methods of making diaphragms for such transducers and to diaphragms made by these methods.

2. Description of the Prior Art

Pressure transducers having a diaphragm exposed to the pressure to be transduced are old in the transducer art. It is also known that the tension and compression stress pattern in the diaphragm can be improved and the sensitivity of diaphragm-type pressure transducers can be increased by providing the diaphragm with a substantially rigid circumferential rim portion. In practical pressure transducers, such rim portions may also serve to facilitate the mounting of the diaphragm relative to the transducer housing or proper.

In practice, great care has to be observed that the provision or presence of the circumferential rim portion does not produce objectionable inherent stresses or internal distortions in the diaphragm. This applies particularly to diaphragms of low-pressure transducers that are to respond to small pressures or pressure variations.

The most advanced prior-art methods known to me for making diaphragms for low-pressure transducers proceed on the machining of the diaphragm and peripheral rim portion out of a block of metal or rod stock. Prior-art machining techniques are very expensive and time consuming in their execution and require the attention and labor of highly skilled personnel. In addition, conventional machining techniques are frequently incapable of providing reliable diaphragms in many low-pressure applications, despite the expenditure of large amounts of money for the starting material and of large amounts of skilled labor for the manufacture.

Summary of the Invention

The subject invention overcomes the above mentioned disadvantages and provides a method of making a substantially internal distortion-free metal diaphragm for a diaphragm-type low-pressure transducer.

The subject invention more specifically resides in the improvement comprising in combination the steps of providing a disk of metal for the diaphragm, such disk having a first diameter, providing a cylindrical first member of rigid material for forming the diaphragm from the disk, such cylindrical member having a second diameter smaller than the mentioned first diameter, providing a second member of rigid material for pressing the disk against the first member, placing the first member relative to the disk so that a peripheral portion of the disk laterally exceeds the first member, forming the peripheral disk portion about the cylindrical first member and pressing the disk against the first member with the second member while the peripheral disk portion is being formed about the cylindrical first member, and releasing the disk with the formed peripheral portion from the first and second members.

The expression "rigid material" as herein employed refers to stiff and hard materials, such as hardened tool steel or other material having the stiffness and hardness of hardened tool steel. This expression excludes hard rubber and other materials having an elasticity similar to that of hard rubber and being therefore incapable of preventing the setting up of objectionable internal stresses or distortions during the forming process.

I am aware that forming techniques in which a counterpunch or backup member presses the material being formed against a forming member have been proposed prior to the subject invention.

By way of example, U. S. Pat. No. 3,434,325, by A. Podesta et al., issued Mar. 25, 1969, proposes the use of a second pusher member in combination with a first pusher member for molding the top surface of a cap for bottles and the like in a desired fashion during the provision of a rolled rim portion on the periphery of a preformed cap blank.

U. S. Pat. No. 2,855,882, by G. C. Berticevich, issued Oct. 14, 1958, proposed the forming of milk container plugs out of fragile fibrous material with the aid of a plunger that urges the material into a die and a backup member in the die for impeding rupture of the fragile material.

The U. S. Pat. No. 3,197,996, by J.H. Zeder, issued Aug. 3, 1965, proposes the use of a backup plunger structure in the deep drawing of preformed automobile doors and similar body structure. In those deep drawing processes, the backup plunger structure serves the purpose of permitting a molding of the door panel and of potentially eliminating a previous need for large flanging edges which were required for holding purposes during the flanging operation.

In the U. S. Pat. No. 2,282,588, by G.A. Lyon, issued May 12, 1942, a backup structure was employed to hold a preformed automotive hub cap against a die pad during the provision of the outer wheel cover rim.

In the U. S. Pat. No. 1,995,357, by A.S. Liss, issued Mar. 26, 1935, a counterpunch was proposed for retaining a blank for a button or badge body during a rim curling operation.

None of these prior-art methods is analogous to the present method of making a substantially internal distortion-free metal diaphragm for a diaphragm-type low-pressure transducer. That a second member for pressing the disk against the above mentioned first member during formation of the peripheral disk portion about such first member may be employed in solving the long-standing problem of providing a substantially internal distortion-free metal diaphragm for a diaphragm-type low-pressure transducer has not been taught in any of the above mentioned references, and they evince no recognition of a potential solution of that problem.

I thus view my present invention at least as a new and unobvious use of a process, machine or manufacture, if not an entirely new and unobvious method in a non-analogous art.

In employing the adjective "low-pressure" herein, I do not wish to be bound to a narrowly defined range, inasmuch as the cost and labor saving advantages and quality improvements of the subject invention can be applied to the manufacture of diaphragms for transducers in various pressure ranges.

However, in terms of particular advantage, I primarily contemplate the application of the subject invention to the manufacture of diaphragms for transducers in pressure ranges up to about 1,000 mm Hg.

It should also be understood that the expression "pressure transducer" as herein employed is intended to be broad enough to cover not only transducers for sensing or measuring pressure as such, but also any other transducer in which pressures or forces are applied to a membrane.

My subject invention also resides in a substantially internal distortion-free diaphragm for a diaphragm-type low-pressure transducer. The essence of this novel diaphragm according to the subject invention is not believed to be susceptible to distinguishing definition in structural terms. Accordingly, the diaphragm according to the subject invention is herein defined by the method of its manufacture.

This method comprises the combination of steps set forth above for defining the method according to the subject invention.

The diaphragm according to the subject invention is novel over prior-art diaphragms for low-pressure transducers, in being characterized by a substantial freedom from objectionable inherent stresses or internal distortions, an increased reliability of operation, and a markedly reduced cost.

BRIEF DESCRIPTION OF THE DRAWINGS

The subject invention will be more readily apparent from the following detailed description of preferred embodiments thereof, illustrated by way of example in the accompanying drawings, in which.

DESCRIPTION OF PREFERRED EMBODIMENTS

Figure 1:
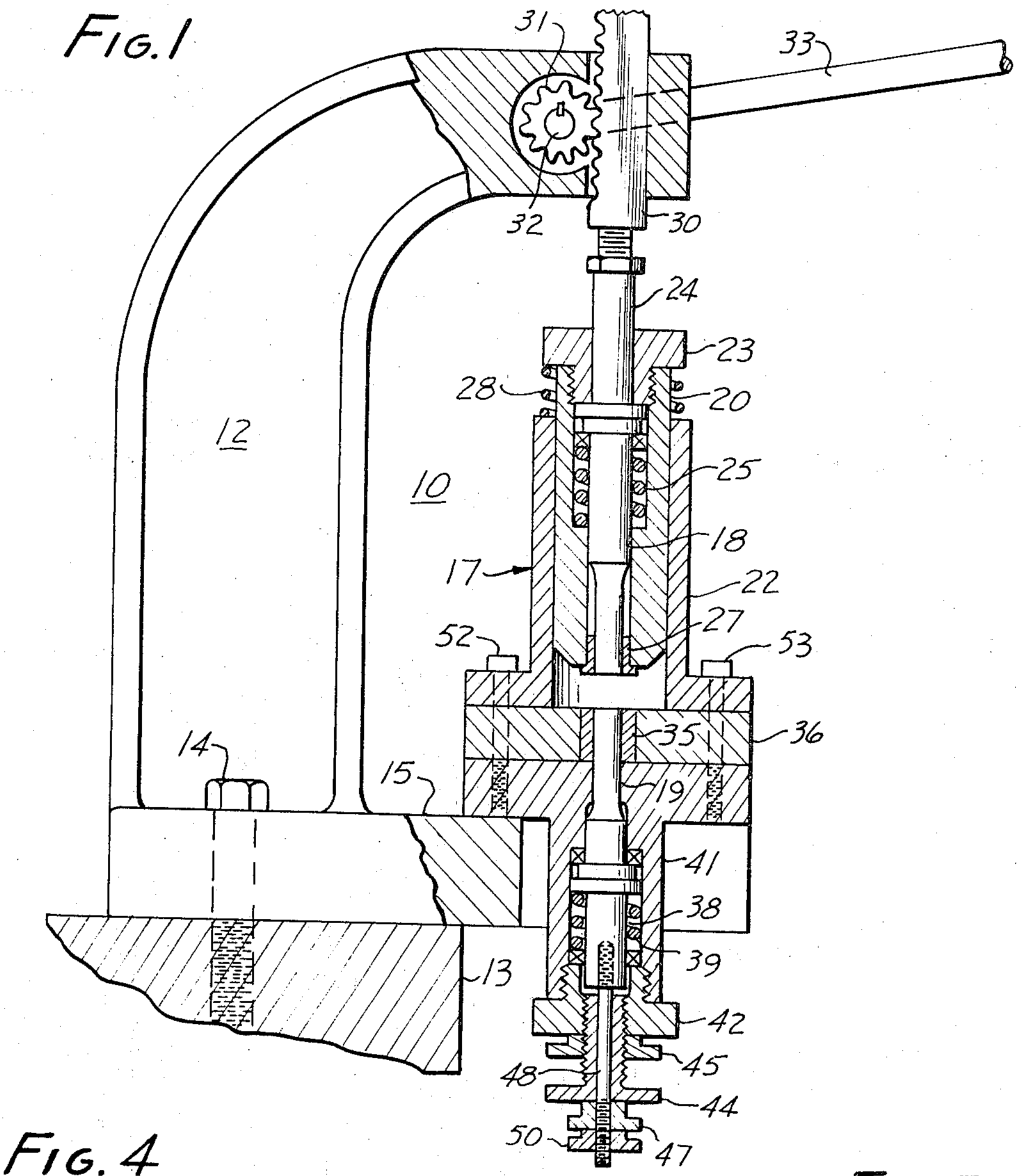
FIG. 1 is an elevation, partially in section, of an apparatus for blanking and forming a transducer diaphragm in accordance with a preferred embodiment of the subject invention.

The blanking and diaphragm forming apparatus 10 of FIG. 1 includes an arbor press 12 mounted on a rigid support 13 by a number of bolts, one of which is seen at 14. The arbor press 12 has a mounting platform 15 projecting beyond the rigid support 13.

The blanking and diaphragm forming proper 17 of the apparatus 10 has a punch 18 and a die punch 19. The punch 18 is mounted in a punch housing 20 which, in turn, is slidable in a punch guide 22. A cap 23 is threaded into the punch housing 20 at the top thereof. A plunger 24 extends through a bore in the cap 23 and carries the punch 18. The lowermost surface of the cap 23 defines a shoulder, limiting upward movement of the punch 18 and plunger 24. A spring 25 in the housing 20 biases the plunger 18 to its illustrated quiescent position. An annular stripper 27 is mounted in the lower end of the plunger housing 20 and encompasses the lower portion of the punch 18.

A spring 28 is located between the punch guide 22 and the cap 23 for biasing the punch housing 20 with punch 18 in the position illustrated in FIG. 1.

The plunger 24 is connected to a rack 30 which meshes with a pinion 31 mounted on a rotatable shaft 32 in the arbor press. An actuating handle 33 is connected to the shaft 32 for selectively rotating the pinion 31.

The blanking and diaphragm forming proper 17 of the apparatus 10 further includes an annular die button 35 mounted in a die button locator 36.

The die punch 19 is mounted on a plunger 38 which is biased upwardly by a spring 39. Part of the die punch 19, the plunger 38, and the spring 39 are located in a spring housing 41.

The upper part of the die punch 19 extends through and is encompassed by the die button 35. The spring 39 acts on the plunger 38 to bias the die punch 19 to its illustrated quiescent position. A cap 42 is threaded in the lower portion of the spring housing 41. A stop screw 44 is threaded in the cap 42 and provides an adjustable stop for limiting the downward motion of the die punch 19. A lock nut 45 permits locking of the stop screw 44 in any desired position.

The upper most rest position of the die punch 19 may be adjusted by a limit screw 47 which is located on a threaded rod 48 that, in turn, is threaded into the plunger 38. The rod 48 thus restrains upward movement of the plunger 38 and die punch 19 in accordance with the setting of the limit screw 48. A lock nut 50 serves to lock the limit screw 47 in any desired position of adjustment.

A number of threaded bolts, two of which are visible at 52 and 53, retain the blanking and diaphragm forming proper 17 in the form of a unitary assembly, as shown in FIG. 1. Similar bolts (not shown) may be employed for mounting the proper 17 on the platform 15.

When the arbor press handle 33 is actuated downwardly, the pinion 31 is rotated clockwise as seen in FIG. 1 to advance the rack 30 and plunger 24 in a downward direction. This will compress the spring 28 so that the punch housing 20, punch 18, and stripper 27 move downwardly substantially in unison until the stripper 27 meets resistance, such as by impingement on a workpiece. Further exertion of pressure on the handle 33 thereupon compresses the spring 25 so that the punch 18 commences to move downwardly relative to the stripper 27. The punch 18 thereby commences to exert pressure on the die punch 19 (e.g. by way of a workpiece) whereupon the die punch 19 moves downwardly relative to the die button 35, thereby compressing the spring 39. The downward travel of the die punch 19 is limited by the particular position of the adjustable stop screw 44.

Figures 2A, 2B, 2C, 3A, 3B, 3C:
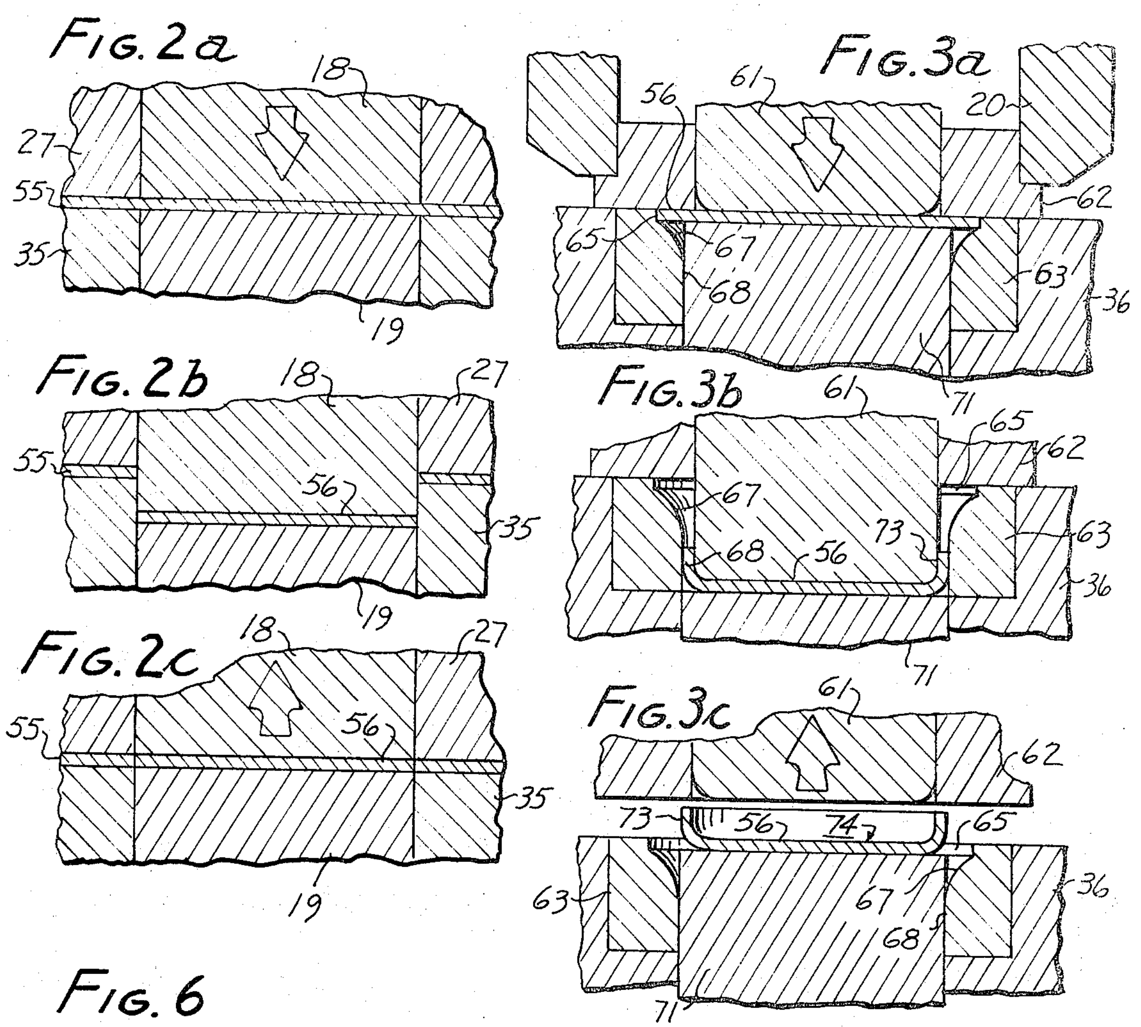
FIGS. 2*a* to *c* show on an enlarged scale a detail of the apparatus of FIG. 1 and illustrate a blanking operation in accordance with a preferred embodiment of the subject invention.
FIGS. 3*a* to *c* show on an enlarged scale a detail of the apparatus of FIG. 1 and illustrate a diaphragm forming operation in accordance with a preferred embodiment of the subject invention.

FIGS. 2*a* to *c* illustrate these operations on an enlarged scale.

More specifically, FIG. 2*a* shows a strip 55 of the metal of which transducer diaphragms are to be formed, and also illustrates the relative positions of the punch 18, die punch 19, stripper 27, and die button 35 at the instant at which the punch 18 and stripper 27 contact the metal strip 55.

FIG. 2b illustrates the result of the exertion of further pressure on the handle 33. As indicated above, such further pressure causes the punch 18 to move downwardly relative to the stripper 27. In this manner, a disk 56 is punched from the metal strip 55 by action of the punch 18 relative to the die button 35. During this punching operation the die punch 19 acts as a backup member for pressing first the strip 55 and then the punched disk 56 against the punch 18. It has been found in practice that this drastically curbs the formation of inherent stresses or internal distortions in the disk 56 during the punching operation.

As seen in FIG. 2*c*, the die punch or backup member 19 also has the function of returning the punched disk 56 to the top surface of the button locator 36, preparatory to a removal of the disk 56 from the blanking apparatus.

After a sufficient number of disks 56 have been punched, the apparatus 10 may be made ready for the forming of transducer diaphragms from these disks. To this end, the blanking punch 18 is replaced by a forming punch 61, part of which is visible in FIG. 3*a*. The diameter of the forming punch 61 corresponds to the desired inside diameter of the diaphragm rim portion. The stripper 27 shown in FIGS. 1 and 2*a* to *c* is replaced by a stripper 62 which accommodates the diameter of the forming punch 61 and which is mounted in the lower part of the punch housing 20.

The blanking die button 35 shown in FIGS. 1 and 2*a* to *c* is replaced by a forming die button 63. As seen in FIGS. 3*a* to *c*, the forming die button 63 has a hollow cylindrical top portion or cavity 65 for receiving the punched disk 56 and for placing this disk relative to the forming punch 61 so that a peripheral portion of the disk 56 laterally exceeds the forming punch 61 when the forming punch has been positioned relative to the disk 56 in the manner shown in FIG. 3*a* by downward actuation of the press handle 33.

The forming die button 63 also has a convexly curved annular wall portion 67 which extends between the cavity 65 and a circular bore 68 for forming purposes. The diameter of the circular bore 68 in the forming die button 63 corresponds to the desired outside diameter of the formed diaphragm or diaphragm rim portion.

The die punch 19 shown in FIGS. 1 and 2*a* to *c* is replaced by a forming backup punch 71, part of which is shown in FIGS. 3*a* to *c*. In the illustrated preferred embodiment, the diameter of the backup punch 71 corresponds to the diameter of the forming die button bore 68.

To prevent ejection of the inserted disk 56 by the backup punch 71, the limit screw 47 shown in FIG. 1 is adjusted so that the upper limit of travel of the backup punch 71 is substantially level with the lower end of the short cavity 65 in which the disk 56 is received. Except for the differences apparent from FIGS. 3*a* to *c* relative to FIGS. 2*a* to *c*, the punches 61 and 71 may be of the same construction as the punches 18 and 19. The punches 18, 19, 61 and 71 may be made of hardened tool steel.

FIG. 3*a* shows the relative positions of the illustrated parts after the press lever 33 has been moved downwardly until the forming punch 61 engages the inserted disk 56 and the stripper 62 is adjacent the forming die button 63. Application of force on the press handle 33 is thereupon continued whereby the forming punch 61 forces the disk 56 into the forming die button 63.

In this manner, a peripheral portion 73 of the disk 56 is formed about the forming punch 61 as shown in FIG. 3*b*. During this forming operation, the disk proper is maintained pressed against the lower surface of the forming punch 61 by the backup punch 71 which is biased by the spring 39 in an upward direction as seen in FIG. 3*b*.

This pressing of the disk proper during the formation of the upright peripheral rim 73 very substantially curbs if not practically eliminates the formation of inherent stresses or internal distortions in the diaphragm being formed. In particular, the clamping of disk proper between the punches 61 and 71 limits the occurrence of stresses during the forming of the rim portion 73 practically to the regions adjacent that rim, leaving the disk proper relatively stress-free.

This is of utmost importance in practice, since inherent stresses or internal distortions in the diaphragm severely limit the attainable sensitivity of the transducer and the quality of its response.

After the plunger 38 has been pressed against the upper surface of the stop screw 44 by downward movement of the punches 61 and 71, the press handle 33 is released or moved upwardly. Action of the spring 25 thereupon withdraws the forming punch 61 into the stripper 62, while action of the spring 28 moves the forming punch 61 and the punch housing 20 upwardly, substantially in unison.

In this manner, a diaphragm 74 having an upright circumferential or peripheral rim portion 73 is formed and is stripped from the forming punch 61 as shown in FIG. 3c.

A preferred material for the strip 55 from which the diaphragm 74 is formed is pure or alloyed titanium. Other suitable materials include formable steel, nickel, copper and beryllium alloys. However, the practice of the methods according to the subject invention is not restricted to any of these materials.

It should be noted at this juncture that the preferred embodiment of the invention illustrated in FIGS. 3*a* to *c* may be practiced with a disk that has not necessarily been produced by the preferred embodiment shown in FIGS. 2*a* to *c*. While the best mode presently contemplated by me is a combination of the embodiments of FIGS. 2*a* to *c* and 3*a* to *c*, it is also within the contemplation of the subject invention to employ in the process of FIGS. 3*a* to *c* disks which have been manufactured by a milling process, or by a blanking process other than the method illustrated in FIGS. 2*a* to *c*, or by any other technique that will produce acceptable blanks. To be acceptable in the practice of the basic method of the subject invention, a blank should to a large extent be free of inherent stresses or internal distortions.

If blanks for the disks 56 have been produced by a method other than the one illustrated in FIGS. 2*a* to *c*, they are preferably heat treated prior to their insertion into the forming die button 63 to relieve inherent stresses or internal distortions. A suitable heat treating process may be of the type shown in FIG. 4 and disclosed below. If desired, such a stress-relief heat treatment may even be applied to the disks 56 produced by the method shown in FIGS. 2*a* to *c*, particularly if the transducer is to respond to very low pressures and pressure variations.

In a similar vein, disks 56 may be subjected to chemical milling prior to their insertion into the forming die button 63. The chemical milling process may be of the type shown in FIG. 5 and described below. Again, it will be found in practice that chemical milling of the blank disks 56 is typically obviated by the blanking process in accordance with a preferred embodiment of the invention shown in FIGS. 2*a* to *c*. However, for transducers of very high quality that are to respond to very low pressures and pressure variations, the chemical milling process may be practiced on the blanks 56 to remove surface strata having objectionable tension or distortion patterns and, generally, to adjust the desired pressure response of the transducer by reducing the disk thickness.

In accordance with a further preferred embodiment of the subject invention, the formed diaphragm 74 with the upright rim portion 73 is subjected to a stress-relief heat treatment. A suitable treatment of this type is diagrammatically illustrated in FIG. 4.

Figure 4:
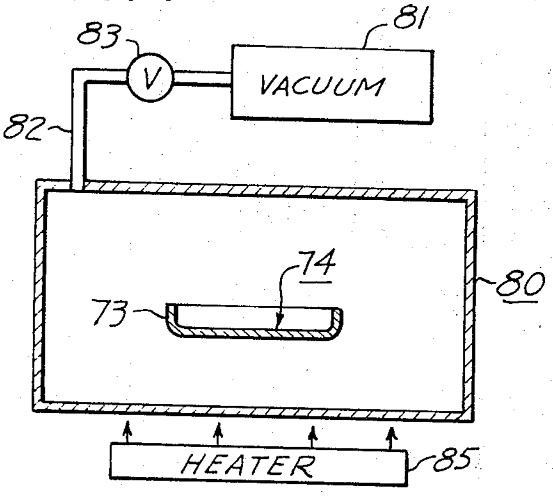
FIG. 4 diagrammatically illustrates a stress-relief heat treating operation which may be practiced in combination with the method shown in FIGS. 3*a* to *c* or the methods shown in FIGS. 2*a* to *c* and 3*a* to *c*, in accordance with a further preferred embodiment of the invention.

According to FIG. 4, the formed diaphragm 74 is placed into an evacuable oven 80. The oven 80 is of a conventional type and is connected to a conventional vacuum pump 81 by a pipe 82 and an on-off valve 83. The vacuum pump 81 exhausts the inside of the oven 80 through the pipe 82 and open valve 83 until a vacuum suitable to the material of the particular diaphragm has been reached. By way of example, and not by way of limitation, suitable vacua include those within a range of from about $10^{-3}$ to $10^{-5}$mm Hg. In my experiments, I employed a vacuum of 0.1 micron Hg for titanium and titanium alloy diaphragms. The valve 83 may be closed after the required vacuum has been provided in the oven 80. The oven is also heated to a high temperature as diagrammatically indicated by the heat source 85. The heat source 85 may be of a conventional gas or electric type.

In this manner, the diaphragm 74 in the evacuated oven 80 is preferably heated to a temperature above 600°F. That temperature may be maintained for a period of from 10 minutes to 1 hour, for instance. In my work with titanium or titanium alloyed diaphragms, I maintained temperatures of about 900°F to 1,100°F for periods of time of about 15 to 30 minutes.

After completion of the heating step, the oven 80 is permitted to cool at a relatively slow rate, such as over a period of some 20 to 60 minutes. Air is then admitted to the oven 80 and the heat-treated diaphragms 74 are removed therefrom. As known to those skilled in heat treating, an inert atmosphere may be provided in the oven 80 as an alternative to the mentioned vacuum.

Figure 5:
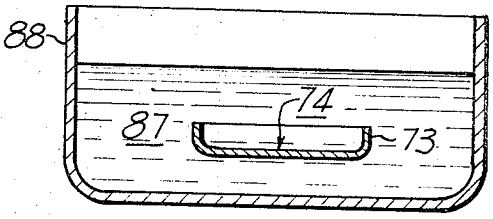
FIG. 5 diagrammatically illustrates a chemical milling method for adjusting the pressure response of the diaphragm which may be practiced in combination with the method shown in FIGS. 3*a* to *c* or the methods shown in FIGS. 2*a* to *c* and 3*a* to *c*, with or without the method shown in FIG. 4, in accordance with yet another preferred embodiment of the subject invention.

As illustrated by the preferred embodiment shown in FIG. 5, the formed diaphragms 74 may be subjected to chemical milling. In accordance with one embodiment, chemical milling is performed without a heat treating step.

In accordance with a preferred embodiment of the subject invention, chemical milling is, however, performed on the diaphragms after heat treatment thereof.

To this end, the heat treated diaphragms 74 are submerged in an etchant 87 contained in a vessel 88. Conventional baskets (not shown) may be employed for facilitating the insertion of the diaphragms into the etchant and the subsequent removal therefrom.

Chemical milling per se is well known and a multitude of standard texts are available listing suitable etchants for particular materials. By way of example, and not by way of limitation, I have employed mixtures of 50 ml $H_2O$, 35 ml $H_2SO_4$, and 15 ml HF for etching titanium and titanium alloy diaphragms.

One benefit of the chemical milling step of FIG. 5 is the removal of undesired surface layers formed as a result of the heat treatment of FIG. 4. Where such surface layers are removed, undesirable stress or distortion patterns located therein are done away with. The chemical milling process of FIG. 5 may also be employed to adjust the pressure response of the diaphragm by reducing the thickness thereof.

Figure 6:
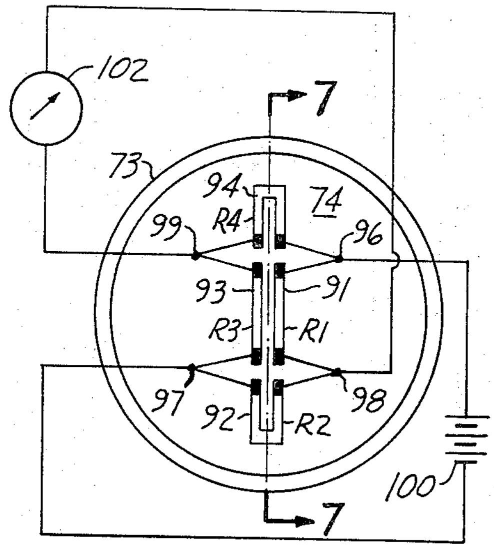
FIG. 6 is a bottom view, on an enlarged scale, of a transducer diaphragm according to, and made by a method of, the subject invention, with bonded strain gage elements and associated measuring circuitry.

The diaphragms according to the subject invention may be employed for low-pressure transducers in any desired manner. A preferred application is shown in FIG. 6 where conventional semi-conductor strain gage elements 91, 92, 93, and 94 are shown bonded to the diaphragm 74 at the inside thereof. Suitable bonding agents and techniques are well known to persons of average skill in the pressure transducer manufacturing art. Reference may in this connection be had to U. S. Pat. No. 3,434,090, by H. Chelner, issued Mar. 18, 1969, the disclosure of which is herewith incorporated by reference herein.

Due to the presence of the upturned flange or rim 73 and its effect on the proper of the diaphragm 74, the peripheral diaphragm portions to which the strain gage elements 92 and 94 are bonded are typically subjected to compression in response to application of pressure to the diaphragm. Conversely, the more central portion of the diaphragm to which the strain gage elements 91 and 93 are bonded are typically subjected to tension in response to applied pressure. This enables the provision of a particularly favorable and sensitive bridge arrangement.

To this effect, the strain gage elements 91 to 94 are connected in a bridge circuit having corners 96 and 97, and corners 98 and 99. A battery or other electric current source 100 is connected to the bridge corners 96 and 97. An electric measuring instrument or data processing equipment 102 is connected between the bridge corners 98 and 99 to indicate or evaluate pressure or pressure variations to which the diaphragm 74 is subjected.

Figure 7:
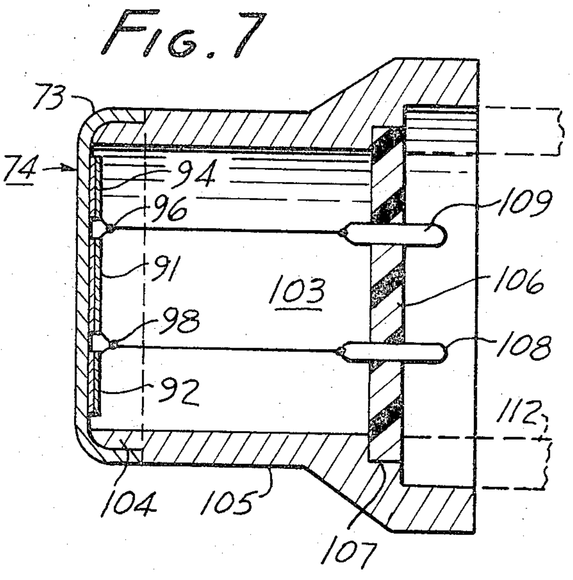
FIG. 7 is a longitudinal section of a pressure transducer in accordance with a preferred embodiment of the subject invention, including a diaphragm according to, and made by a method of, the subject invention. The diaphragm is shown in FIG. 7 in section taken on the line 7 — 7 in FIG. 6.

As shown in FIG. 7, the upright flange or rim 73 has the further advantage of facilitating the mounting of the diaphragm 74 to the transducer proper.

According to FIG. 7, the flange or rim 74 of the diaphragm 74 is hermetically bonded or welded to a projecting shoulder 104 of a cylindrical transducer housing 105. The transducer 103 shown in FIG. 7 further includes a disk 106 of electrically insulating material which is fitted in a further shoulder 107 of the housing 105. Conventional contact pins, two of which are visible at 108 and 109, are provided for permitting contact between the bridge corners 97 to 99 and the external equipment 100 and 102. A housing 112 for an electric cable terminal (not shown) is indicated in dotted outline in FIG. 7 as being fitted in the transducer housing 105 adjacent the terminal disk 106.

Prototypes of transducers provided with diaphragms made in accordance with the subject invention have been very successfully tested in medical and related fields. In particular, small transducers in accordance with the subject invention have been successfully employed in measuring minute blood pressure variations.

Similar and also quite different low-pressure transducer applications of the subject invention have been tested or are readily feasible because of the freedom of the transducer diaphragms according to the subject invention from objectionable inherent stresses or internal distortions.

I claim:

1. In a method of making a substantially internal distortion-free metal diaphragm for a diaphragm-type low-pressure transducer, the improvement comprising in combination the steps of:
providing a disk of metal for said diaphragm, said disk having a first diameter;
providing a cylindrical first member of rigid material for forming said diaphragm from said disk, said cylindrical member having a second diameter smaller than said first diameter;
providing a second member of rigid material for pressing said disk against said first member;
placing said first member relative to said disk so that a peripheral portion of said disk laterally exceeds said first member;
forming said peripheral disk portion about said cylindrical first member and pressing said disk against said first member with said second member while said peripheral disk portion is being formed about said cylindrical first member;
releasing said disk with said formed peripheral portion from said first and second members;
stress-relief heat treating said disk with said formed peripheral portion; and
adjusting the pressure response of said diaphragm including said disk with said formed peripheral portion by chemical milling.

2. In a method of making a substantially internal distortion-free metal diaphragm for a diaphragm-type low-pressure transducer, the improvement comprising in combination the steps of:
providing a disk of metal for said diaphragm, said disk having a first diameter;
providing a cylindrical first member of rigid material for forming said diaphragm from said disk, said cylindrical member having a second diameter smaller than said first diameter;
providing a second member of rigid material for pressing said disk against said first member;
placing said first member relative to said disk so that a peripheral portion of said disk laterally exceeds said first member;
forming said peripheral disk portion about said cylindrical first member and pressing said disk against said first member with said second member while said peripheral disk portion is being formed about said cylindrical first member;
releasing said disk with said formed peripheral portion from said first and second members; and
adjusting the pressure response of said diaphragm including said disk with said formed peripheral portion by chemical milling.

3. In a method of making a substantially internal distortion-free metal diaphragm for a diaphragm-type low-pressure transducer, the improvement comprising in combination the steps of:
providing a strip of metal for making said diaphragm;
providing a punch and a hollow punching die for punching a disk having a first diameter from said strip;
providing a backup member of rigid material for pressing said strip against said punch;
placing said strip between said punch and said punching die;
punching said disk from said strip with said punch and said die and pressing said disk against said punch with said backup member while said disk is being punched from said strip;
releasing said punched disk from said punch, backup member and die;
providing a cylindrical first member of rigid material for forming said diaphragm from said disk, said cylindrical member having a second diameter smaller than said first diameter;
providing a second member of rigid material for pressing said disk against said first member;
placing said first member relative to said disk so that a peripheral portion of said disk laterally exceeds said first member;
forming said peripheral disk portion about said cylindrical first member and pressing said disk against said first member with said second member while said peripheral disk portion is being formed about said cylindrical first member;
releasing said disk with said formed peripheral portion from said first and second members;
stress-relief heat treating said disk with said formed peripheral portion; and
adjusting the pressure response of said diaphragm including said disk with said formed peripheral portion by chemical milling.

4. In a method of making a substantially internal distortion-free metal diaphragm for a diaphragm-type low-pressure transducer, the improvement comprising in combination the steps of:
providing a strip of metal for making said diaphragm;
providing a punch and a hollow punching die for punching a disk having a first diameter from said strip;
providing a backup member of rigid material for pressing said strip against said punch;
placing said strip between said punch and said punching die;
punching said disk from said strip with said punch and said die and pressing said disk against said punch with said backup member while said disk is being punched from said strip;
releasing said punched disk from said punch, backup member and die;
providing a cylindrical first member of rigid material for forming said diaphragm from said disk, said cylindrical member having a second diameter smaller than said first diameter;
providing a second member of rigid material for pressing said disk against said first member;
placing said first member relative to said disk so that a peripheral portion of said disk laterally exceeds said first member;
forming said peripheral disk portion about said cylindrical first member and pressing said disk against said first member with said second member while said peripheral disk portion is being formed about said cylindrical first member;

releasing said disk with said formed peripheral portion from said first and second members; and adjusting the pressure response of said diaphragm including said disk with said formed peripheral portion by chemical milling.

* * * * *